United States Patent
Vogels et al.

(10) Patent No.: US 6,660,370 B2
(45) Date of Patent: Dec. 9, 2003

(54) METHOD FOR MAKING A COLORED MULTILAYER COMPOSITE, AND COLORED MULTILAYER COMPOSITE PRODUCED BY THE METHOD

(75) Inventors: Laurens Petrus Vogels, Weert (NL); Wilhelmus Josephus Alex Van De Wall, Geldrop (NL)

(73) Assignee: Trespa International B.V., Weert (NL)

( * ) Notice: Subject to any disclaimer, the term of this patent is extended or adjusted under 35 U.S.C. 154(b) by 243 days.

(21) Appl. No.: 09/767,058

(22) Filed: Jan. 22, 2001

(65) Prior Publication Data

US 2002/0011575 A1 Jan. 31, 2002

(30) Foreign Application Priority Data

Feb. 2, 2000 (DE) .......................................... 100 04 440

(51) Int. Cl.[7] .................................................. B05D 3/06
(52) U.S. Cl. .......................................... 428/215; 427/54
(58) Field of Search ........................ 250/503.1; 427/54; 428/215

(56) References Cited

U.S. PATENT DOCUMENTS

| 3,658,620 A | * | 4/1972 | Hall ............................ 156/272 |
| 3,899,611 A | * | 8/1975 | Hall ............................. 427/54 |
| 4,092,198 A | | 5/1978 | Scher et al. |
| 5,468,542 A | * | 11/1995 | Crouch ........................ 428/215 |
| 5,895,705 A | * | 4/1999 | Crouch et al. .............. 156/247 |
| 6,472,026 B1 | * | 10/2002 | Maag et al. ................ 427/492 |

FOREIGN PATENT DOCUMENTS

| DE | 31 12 437 C1 | 9/1982 |
| DE | 42 15 070 A1 | 11/1993 |
| DE | 44 09 478 A1 | 9/1995 |
| DE | 197 57 082 A1 | 6/1999 |
| DE | 197 51 479 A1 | 7/1999 |
| EP | B 0535 504 | 7/1998 |
| WO | WO 94/09983 | 5/1994 |
| WO | WO 99/12736 A1 | 3/1999 |

* cited by examiner

*Primary Examiner*—John R. Lee
*Assistant Examiner*—Phillip A Johnston
(74) *Attorney, Agent, or Firm*—ProPat, LLC

(57) ABSTRACT

The method for making a multilayer composite having one or more colors brings together a number of acrylic layers, which are partially cured in a first step and completely cured in a second step. The curing takes place with actinic radiation, such as accelerated electrons, UV radiation or X-ray radiation, the curing unit operating with different dosage rates during the two steps. The curable acrylic layers are applied to the respective supporting layers by screen printing or stencil printing, or else may be applied to the supporting layers by casting or with the aid of printing rollers.

18 Claims, 6 Drawing Sheets

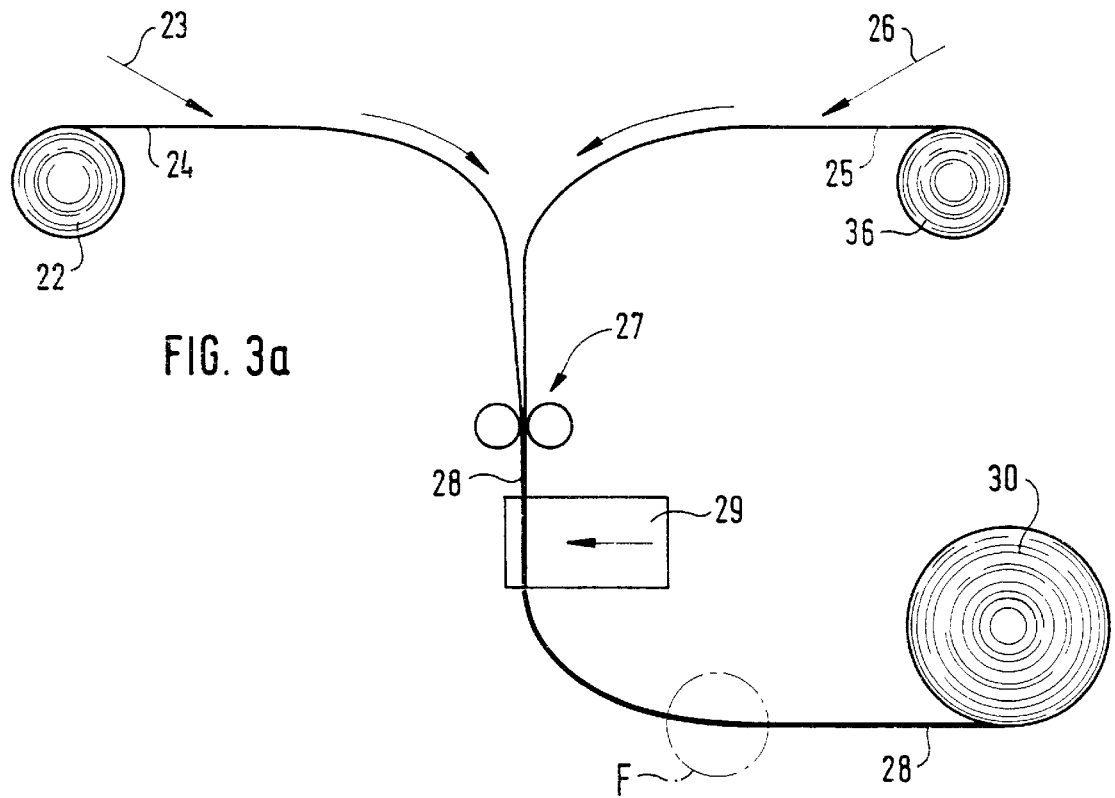
FIG. 3a
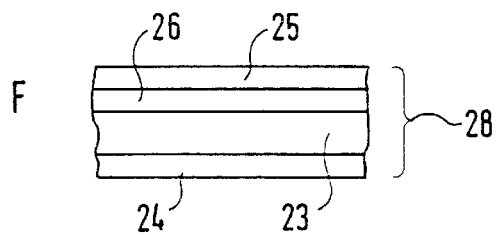

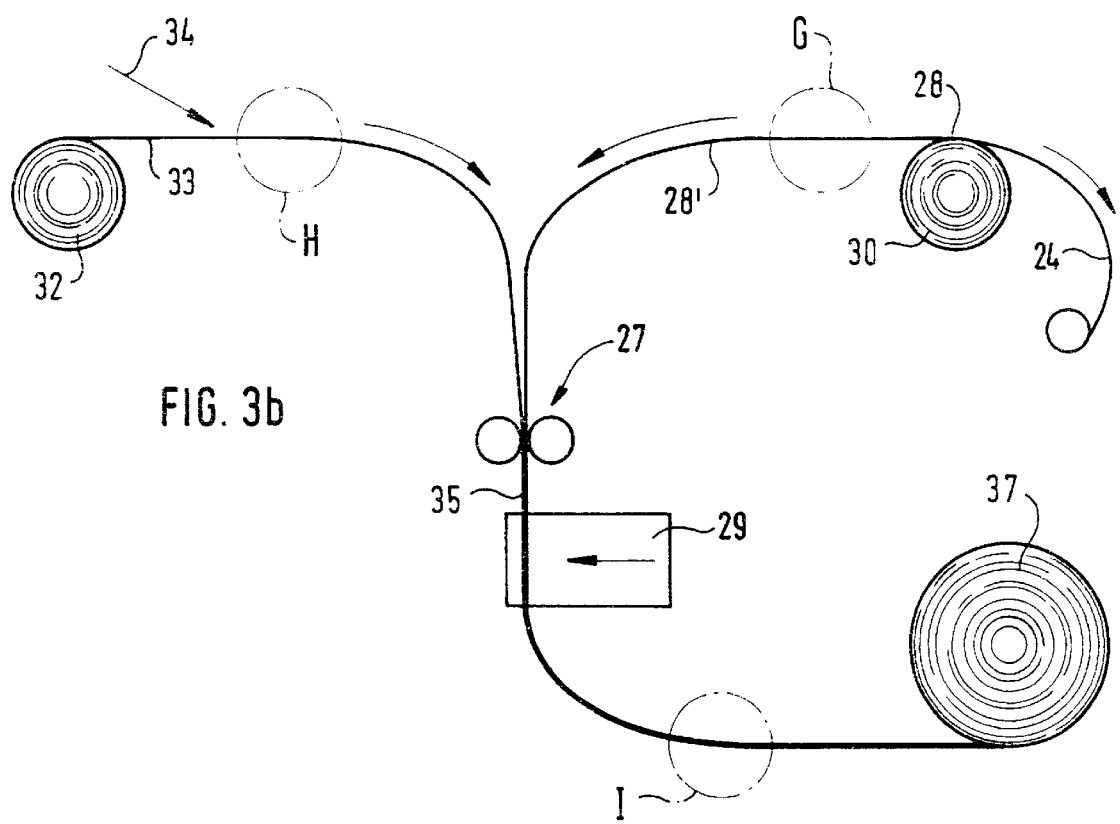
FIG. 3b
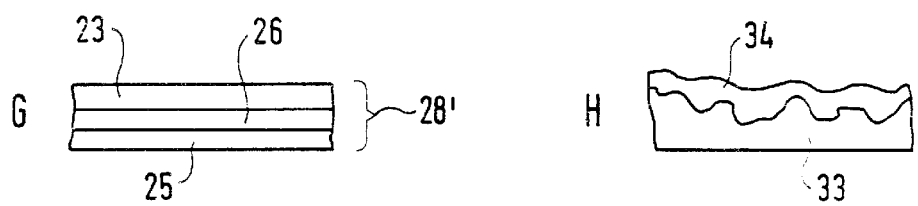
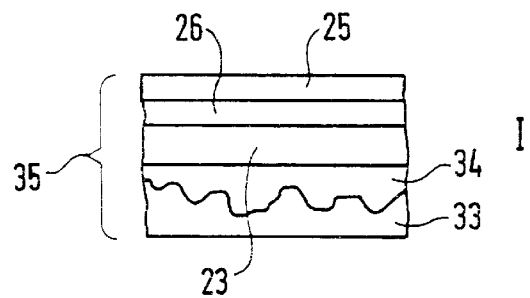

METHOD FOR MAKING A COLORED MULTILAYER COMPOSITE, AND COLORED MULTILAYER COMPOSITE PRODUCED BY THE METHOD

FIELD OF THE INVENTION

The present invention relates to a method for making a colored multilayer composite by laminating to each other, and curing, two or more radiation-curable layers, one of these layers being a clear outer layer and the other layers being equipped with color pigments, and also to a colored multilayer composite of this type, produced by the method.

BACKGROUND OF THE INVENTION

WO 94/09983 has disclosed that colored vehicle parts can be produced with at least two different shades by transfer onto the vehicle parts of colored acrylic layers which have been applied to casting films. A laminate of this type is composed of a first polyester supporting layer, of a clear layer made from an optically clear polymer which comprises fluorinated hydrocarbon resin and acrylic resin, the clear layer having been applied on the surface of the supporting layer, and also of a binder layer and of a color layer made from chlorinated polymer with dispersed color pigments. Laminated onto the color layer is a second polyester supporting layer with an adhesive layer. This laminate takes the form of a multilayer composite and is applied to vehicle parts using techniques associated with pressure-sensitive self-adhesives, followed by removal of the first supporting layer abutting the clear layer, so that the clear layer forms a weather-resistant outer layer of the laminate. The PVC-containing color layer is flexible at room temperature and permits dimensional change within the laminate, which can therefore be laminated onto vehicle parts of three-dimensional shape. For durable and firm adhesive anchoring of the color layers, this laminate requires intermediate layers made from specific adhesives which have to fulfill certain preconditions.

EP 0535504 B1 discloses a process for image transfer to coated surfaces, in particular those of timber-based materials, the surface being coated with a polymeric layer made from low-molecular-weight polymers and requiring curing by irradiation with electrons. The polymeric layer is brought into contact with a transfer medium bearing color pigment, with exposure to heat. There is diffusion of the color pigments into the polymeric layer. The irradiation with electrons cures the polymeric layer, crosslinking being undertaken with a radiation dose of from 40 to 80 kGray.

SUMMARY OF THE INVENTION

It is an object of the invention to provide a method which produces an at least two-coloured multilayer composite, can be carried out cost-effectively on an industrial scale and which moreover manufactures the multilayer composite without adhesive layers and produces a multilayer composite whose decorative properties are durably resistant to the effects of weathering.

According to the invention, the manner of achieving this object comprises, in a first step, partially curing the radiation-curable layers applied to supporting layers, and in a second step, completely curing the radiation-curable layers.

The features of the method of the invention are that in the first step, the first radiation-curable layer, equipped with color pigments, is applied to a first supporting layer, that the second radiation-curable layer, equipped with color pigments, is applied to a second supporting layer, where the color pigments of the first layer differ from those of the second layer, that the two supporting layers are laminated, with the radiation-curable layers facing toward one another, to give a multilayer composite, and the radiation-curable layers are partially cured, and that in the second step, the multilayer composite is laminated with a plastic film to which a radiation-curable clear outer layer is applied, which faces toward the multilayer composite, and that the mutually abutting layers are completely cured.

In executing the method, the partial curing and the complete curing of the layers is undertaken with the aid of actinic radiation. The actinic radiation used here comprises accelerated electrons, UV radiation in the wavelength region from 50 to 480 nm or X-ray radiation in the wavelength region from 0.05 to 8.0 nm.

In another embodiment of the method, use is made of radiation-curable layers based on C1–C6-alkyl acrylates and/or methacrylates, in particular those based on methyl acrylates or on ethyl acrylates and/or methacrylates.

In one embodiment of the method, the dose of actinic radiation in the steps is adjusted so that the amount of radiation required for the complete curing of the radiation-curable layers is not applied until the final irradiation stage.

If the amount of radiation theoretically needed for complete curing has been reached prior to the final irradiation stage, the bond strength of the clear outer layer can be adversely affected.

Further embodiments of the method arise from the measures described in claims 7 to 15.

The invention uses the method to produce a two- or multicolored multilayer composite which is composed of a supporting layer with a smooth regular surface, which is a plastic film or is a phenolic-resin-impregnated paper web, and of two or three acrylic-based layers laminated to one another and radiation-cured and comprising different color pigments, and of an acrylic-based clear outer layer, and also of a peelable plastic film as protective layer.

A multilayer composite of this type may be a decorative coating bonded to plates or panels made from layers of paper saturated with phenolic resins and/or with melamine resins, or made from cardboard packaging, from wood, from plastics, from resin-saturated compacted wood chips or the like, to give weather-resistant panels for outdoor use.

BRIEF DESCRIPTION OF THE DRAWINGS

FIG. 3a shows a diagram of a first step modified from FIG. 2a for the production of a metallic-effect multilayer composite according to the invention, and FIG. 3b shows a diagram of a second step modified from FIG. 2b for the production of a metallic-effect multilayer composite.

DETAILED DESCRIPTION OF THE INVENTION

Figure 1:
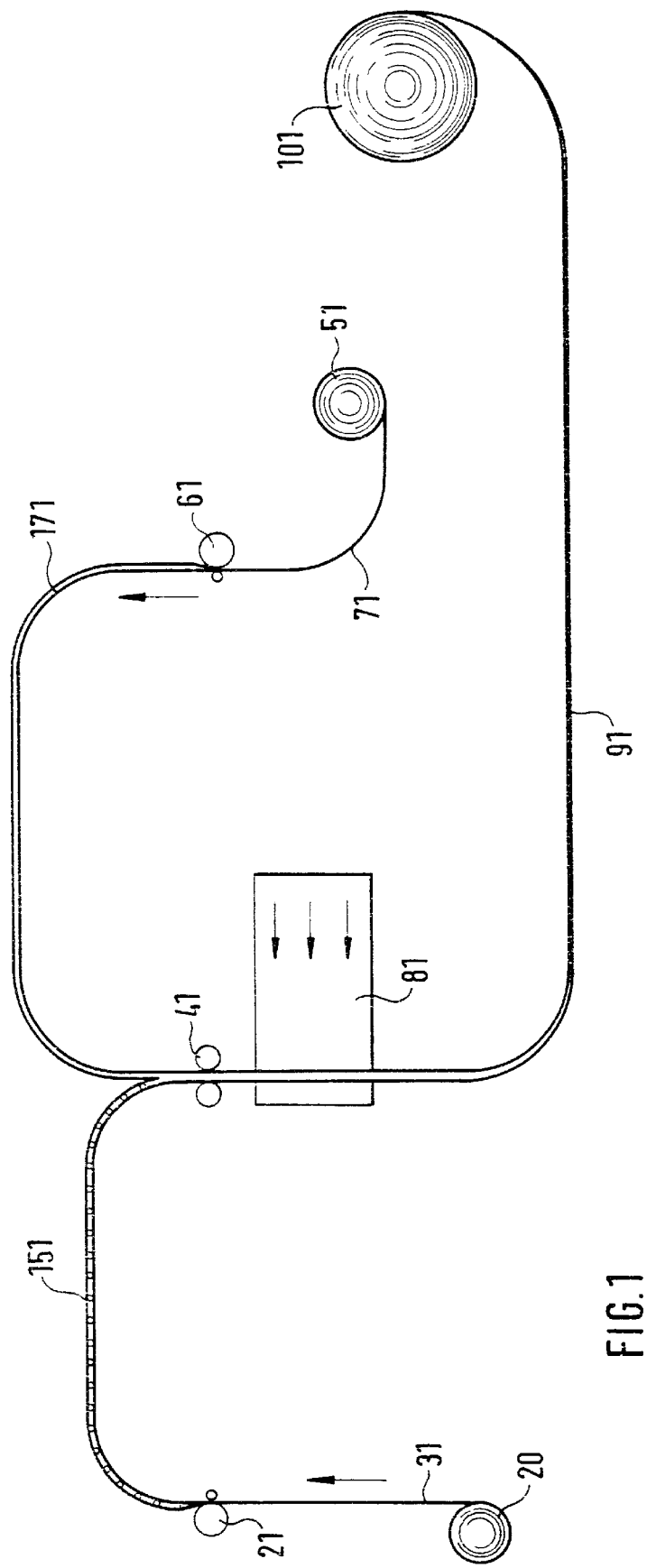
FIG. 1 shows a process diagram for the production of a single-coloured multilayer composite from a paper support, a curable color layer, a clear outer layer and a plastic film as in the prior art.

In FIG. 1, a phenolic-resin-saturated or phenolic-resin-impregnated paper substrate 31 has been wound up on a feed roll 20. The web of paper substrate 31 is unwound from the feed roll 20 and passes through a printing unit 21 where screen printing or stencil printing is used to apply a color layer 151. This color layer 151 is an acrylic layer which comprises color pigments.

Furthermore, a plastics film 71 which has been wound onto a plastics film feed roll 51 is unwound and passed through another printing unit 61. In this printing unit 61, screen printing or stencil printing is used to apply a colorless protective layer to the plastic film 71, examples of which are a polyolefin, such as polyethylene or polypropylene, a polyester or the like. The colorless protective layer 171 is also acrylic-based. The paper substrate 31 with the color layer 151 and the plastics film 71 with the colorless protective layer 171 are brought together in a laminating unit 41 and laminated to each other with the aid of heat and/or pressure, to give a multilayer composite 91. After leaving the laminating unit 41, the multilayer composite 91 passes through a curing unit 81, in which accelerated electrons are used for complete curing of the two mutually abutting layers, namely the color layer 151 and the protective layer 171, thus forming a solid composite. The multilayer composite 91 is a single-coloured laminate with an optically clear outer layer or protective layer 171, and is wound up onto a multilayer composite feed roll 101.

This known process does not permit production of a two- or multicolored multilayer composite comprising curable layers without the use of adhesive layers, since complete curing of the layers takes place immediately after lamination of the layers to give the multilayer composite. This means that bonding between further layers is not possible without resorting to the use of adhesive layers.

The curing of the layers may be undertaken with actinic radiation quite generally, but specifically for the purposes of this invention the radiation is preferably highly accelerated electrons, as preferably used in the curing unit 81, and UV radiation in the wavelength region from 50 to 480 nm or X-ray radiation in the wavelength region from 0.05 to 8.0 nm.

For the curing by irradiation with accelerated electrons, a maximum dose of up to 60 kGray is generally sufficient. After curing with a dose of this type, the majority of the reactive acrylic groups have reacted, and the cured layers are completely dry and solid. If the curable layers are irradiated with a dose lower than that given above the curing achieved is only partial, meaning that there are still sufficient residual reactive acrylic groups which can react with another acrylic layer. This is the inventive concept on which the method of the invention is based, as is described in more detail with reference to FIGS. 2a to 3b.

Figure 2A:
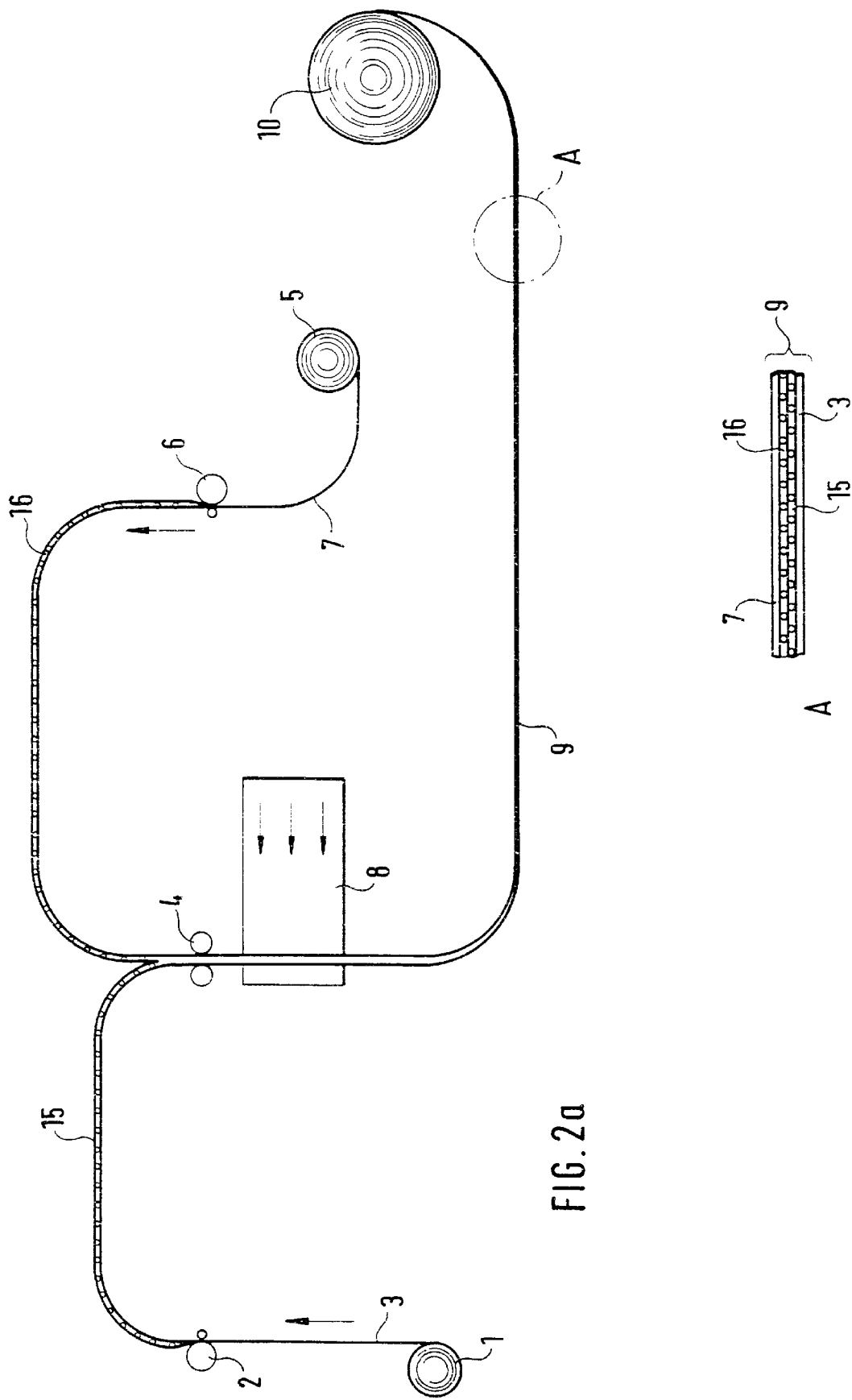
FIG. 2a shows a diagram of the first step in the production of an at least two-coloured multilayer composite according to the invention.
Figure 2B:
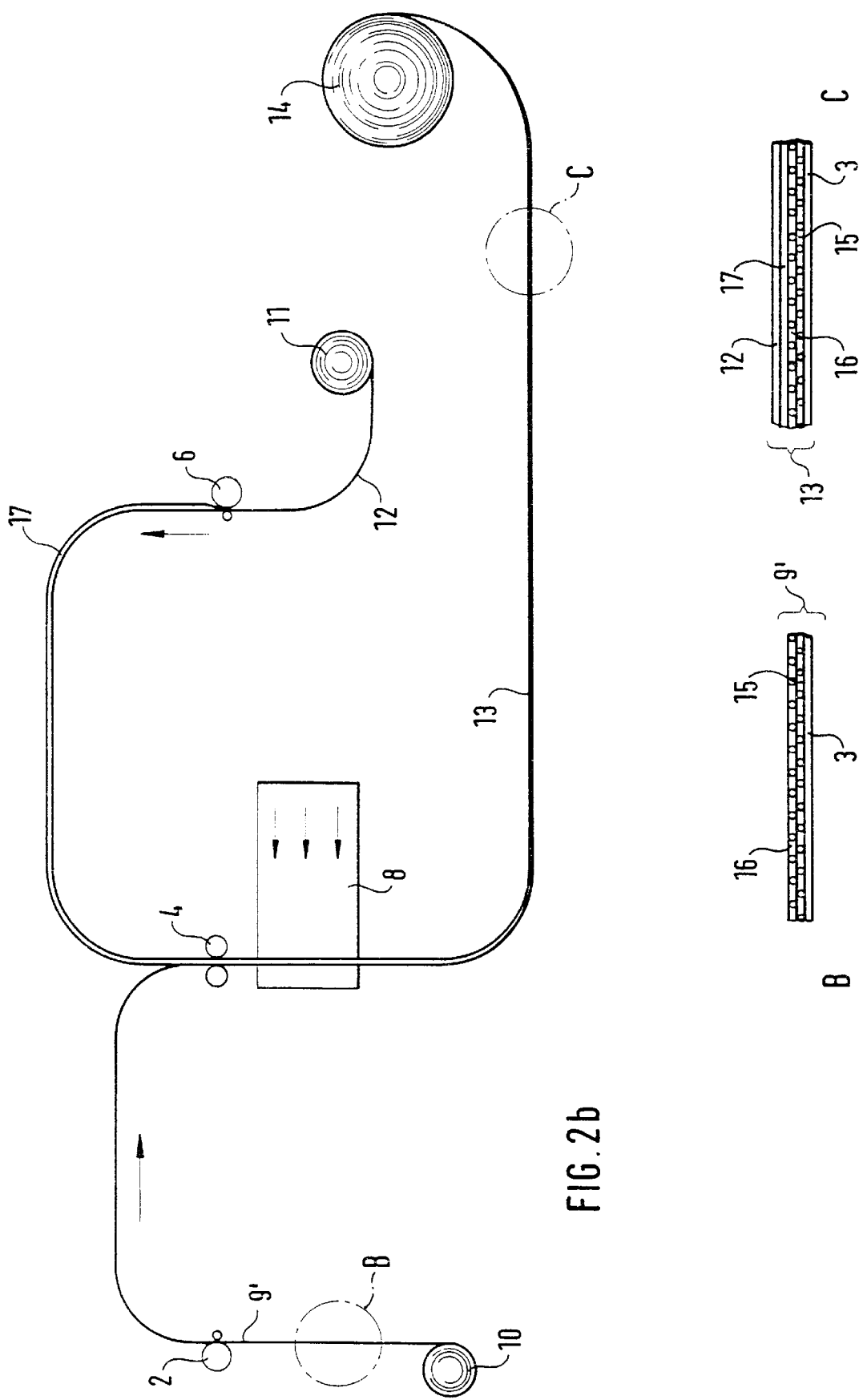
FIG. 2b shows a diagram of the second step in the production of an at least two-coloured multilayer composite.
Figure 2C:
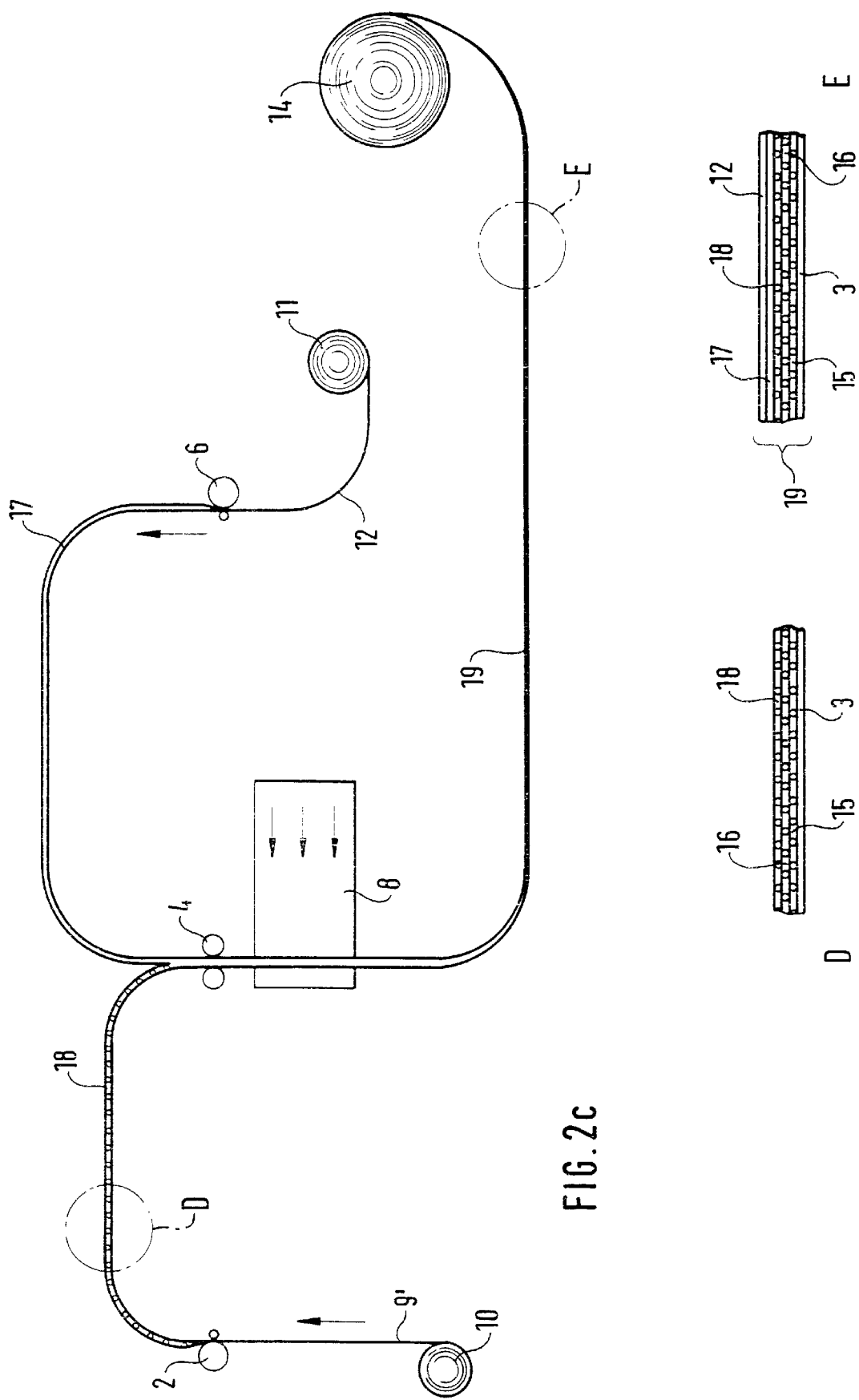
FIG. 2c shows a diagram of a second step modified from FIG. 2b for the production of a three-coloured multilayer composite according to the invention.

In a first step, as shown in FIG. 2a, a first supporting layer 3, for example a film web or a phenolic-resin-saturated paper web, is equipped with a first radiation-curable layer 15. This first curable layer is an acrylic-based layer and comprises color pigments of a particular color. The supporting layer 3 has been wound up on a first feed roll 1 and, after unwinding, is passed through a first printing unit 2, in which screen printing or stencil printing is used to apply the first curable layer 15. A second supporting layer 7, for example a plastics film, has been wound up as a web on a second feed roll 5. This second supporting layer 7 is unwound from the second feed roll 5 and passes through a second printing unit 6, in which screen printing or stencil printing is used to apply a second radiation-curable layer 16 which comprises color pigments of a particular color. These color pigments differ from the color pigments in the first curable layer 15. The two supporting layers 3 and 7 are brought together with the layers 15, 16 facing toward one another immediately prior to a first laminating unit 4, in which they are pressed together with exposure to heat and/or pressure to give a multilayer composite 9, a section of which is shown in detail at A. After leaving the laminating unit 4, the multilayer composite 9 passes through a first curing unit 8, in which accelerated electrons partially cure the two layers 15, 16. The electron radiation dose is in the range from 0.5 to 30 kGray and is insufficient for complete curing of the two layers. The curing may also be carried out using UV radiation in the wavelength region from 50 to 480 nm or X-ray radiation in the wavelength region from 0.05 to 8.0 nm, instead of accelerated electrons. The partial curing of the layers 15, 16 takes place in the first step using not more than 30% of the maximum radiation dose required for complete curing of the layers. This gives a two-coloured multilayer composite 9, which is wound up onto a multilayer composite feed roll 10. There then follows the second step, as shown in FIG. 2b, in which the two-coloured multilayer composite 9 passes through the existing system for a second time. To this end, the multilayer composite feed roll 10 replaces the first feed roll 1 in the first step, and the multilayer composite 9 is unwound from the feed roll 10. Prior to the second step it is useful for the second supporting layer 7 to be removed from the multilayer composite 9. A section of the multilayer composite 9, without the supporting layer 7 which has been removed, is shown in detail at B. The composite 9 passes through the first printing unit 2 which has been taken out of operation in the present instance, since there is no further color layer to be applied.

A web-shaped plastics film 12 is unwound from a third feed roll 11, and passes through the second printing unit 6, in which screen printing or stencil printing is used to apply an optically clear layer, namely what is known as the clear outer layer 17. Although no color pigments are present in this layer, it is similar to the layers 15 and 16 in being an acrylic layer curable by actinic radiation. The multilayer composite 9 and the plastics film 12 which acts as a protective film, with the clear outer layer 17 which has been applied, are brought together prior to or in the laminating unit 4, and laminated to each other in this laminating unit by means of heat and/or pressure. After leaving the laminating unit 4, the laminate made from two-colored multilayer composite 9 and from the clear outer layer 17 together with the plastics film 12 passes through the curing unit 8, which in the second step uses the accelerated electrons at full power, i.e. a dose of from 1.65 to 100 kGray, to bond the clear outer layer 17 with the two layers 15 and 16 which have previously been partially cured. The full radiative power of the curing unit 8 completely cures the curable layers 15, 16, 17, and these form a dry and firmly bonded ply within the two-colored multilayer composite 13. This multilayer composite 13 is wound up onto a multilayer composite feed roll 14. A section of the multilayer composite 13 is shown in detail and at C on an enlarged scale.

It is also possible to apply a still further color layer in the second step, thus obtaining a three-colored multilayer composite. The only requirement for this is that, in what is known as the modified second step shown in FIG. 2c, during passage of the two-colored multilayer composite 9 through the first printing unit 2 screen printing or stencil printing is used to apply a radiation-curable layer 18 which has been equipped with color pigments. A section of the multilayer composite with the curable layers 15, 16 and 18, and also with the first supporting layer 3, is shown in detail at D. In other respects the procedure is unchanged from the second step as shown in FIG. 2b. A section of the resultant multilayer composite 19 made from a first supporting layer 3, the curable layers 15, 16 and 18 with color pigments, the clear outer layer 17 and the protective film 12 is shown in detail at E.

Examples of the curable layers 15, 16, 17 and 18 used are those based on C1–C6-alkyl acrylates and/or methacrylates, in particular based on methyl acrylates or on ethyl acrylates and/or methacrylates. Alongside these, use may also be made of comonomer units, in particular acrylonitrile or alkyl vinyl ethers.

A very general rule for the method is that the dose of actinic radiation which is applied in the curing unit 8 has been adjusted so that the amount of radiation required for complete curing of the curable layers is not applied until the final irradiation stage. In the first step, therefore, the curable layers 15, 16 are brought into contact with not more than 30% of the maximum dose of actinic radiation required for full curing. In the second step, the two partially cured layers 15, 16 and the clear outer layer 17 are brought into contact with a dose of from 30% to 100% of the actinic radiation for full curing. This again applies to the case where another curable layer 18 with color pigments is additionally applied to the multilayer composite 9 in the modified second step. The color of these color pigments differs from that of the color pigments of the curable layers 15 and 16. It is preferable for the color pigments of the layers 15, 16 and 18 to be selected from the group consisting of metal oxides, metal hydroxides and metal oxide hydrates, sulfur-containing silicates, metal sulfides, metal selenides, complex metal cyanides, metal sulfates, metal chromates, metal molybdates, azo pigments, indigoids, dioxazine pigments, quinacridone pigments, phthalocyanine pigments, isoindolinone pigments, perylene pigments, perinone pigments, metal complex pigments, alkali blue pigments and diketopyrrolopyrrole (DPP) pigments.

In another embodiment of the method, the curable layers 15 to 18 may be applied to the associated supporting layers by casting or by printing rollers, instead of by screen printing or stencil printing.

The plastics of the web-shaped plastics films are particularly selected from the group consisting of polyolefins, such as polyethylene and polypropylene, and polyesters, or from the group consisting of polyamides.

The two- or multicolored multilayer composite 13 obtained by the method is therefore composed of a supporting layer, which is a film or a phenolic-resin-impregnated paper web 3, of two or three acrylic-based, cured layers 15, 16, 18 laminated to one another and each comprising a different color pigment, of an acrylic-based clear outer layer 17, and also of a peelable plastics film 12 as protective layer. This multilayer composite 13 is preferably used as a decorative coating bonded to sheets made from layers of paper saturated with phenolic resins and/or with melamine resins, or made from cardboard packaging, from wood, from plastic, from resin-saturated compacted wood chips or the like. Applying this multilayer composite 13 to sheets of this type gives weather-resistant panels or decorative plates for outdoor use on buildings, for example as cladding, or in indoor areas subject to moisture.

In the modified first step as described in FIG. 3a, a third web of supporting layer 24 has been wound up on a fourth feed roll 22. An example of the supporting layer 24 is a plastics film, preferably a polypropylene film with a very uniform, smooth surface. The supporting layer 24 is drawn off from the feed roll 22, and a metallic coating 23 is applied to the supporting layer 24. The metallic coating 23 is composed of an acrylate-based layer in which color pigments have been dispersed. The color pigments are preferably metal oxide pigments, in particular aluminum oxide pigments which give the metallic coating 23 a metallic color.

A fourth supporting layer 25 has been wound up on a sixth feed roll 36, and after this layer has been unwound from the feed roll 36 it receives an application of a radiation-curable clear layer 26. The supporting layer 25 is again a plastics film with a smooth uniform surface. With the metallic coating 23 and clear layer 26 facing toward one another, the two supporting layers 24, 25 are brought together in a second laminating unit 27, where they are laminated by means of pressure and/or heat, to give a multilayer composite 28, which immediately after emerging from the laminating unit 27 passes through a second curing unit 29. In this curing unit 29, the clear layer 26 and the metallic coating 23 are partially cured by an electron beam with a dose of from 2 to 30 kGray, followed by winding-up onto a multilayer composite feed roll 30. A section of the multilayer composite 28 is shown in detail at F.

In the modified second step shown in FIG. 3b, the multilayer composite feed roll 30 is on the right-hand side, and when the multilayer composite 28 is unwound from the feed roll 30 the supporting layer 24 is simultaneously removed from the metallic coating 23. A section of the multilayer composite 28, without the supporting layer 24, is shown in detail at G.

On the left-hand side of FIG. 3b a fifth supporting layer 33 wound up on a fifth feed roll 32 has a highly non-uniform surface, on which, after unwinding from the feed roll 32, a primer layer and/or adhesion-promoter layer 34 made from a radiation-curable primer and/or from a radiation-curable adhesion promoter is applied. A section through the supporting layer 33 and the primer layer and/or adhesion-promoter layer 34 is shown in detail at H. An example of the supporting layer 33 is a phenolic-resin-impregnated paper web, or what is known as a kraft paper.

The multilayer composite 28, without the supporting layer 24, and the supporting layer 33 with the primer layer and/or adhesion-promoter layer 34 applied are brought together in the second laminating unit 27, where they are pressed together using heat and/or pressure, to give a multilayer composite 35. The multilayer composite 35 then passes through the second curing unit 29, in which accelerated electrons are used for complete curing of the layers 23, 26 and 34 in the multilayer composite 35, using a dose of from 6.7 to 100 kGray from the electron beam. A section of the structure of the multilayer composite 35 is shown in detail at I. The multilayer composite 35 is wound up onto a multilayer composite feed roll 37 and used for further processing as a decorative coating for plates or panels.

The curing unit 29 may also be a UV or X-ray unit, in which case the curing of the layers takes place with the aid of UV radiation in the wavelength region from 50 to 480 nm or X-ray radiation in the wavelength region from 0.05 to 8 nm.

What is claimed is:
1. A method for forming a colored multilayer composite by applying at least two (or more) radiation-curable layers to flexible supporting layers made of film web or paper web and laminating the supporting layers to each other, whereby the radiation-curable layers contain color pigments, comprising the following steps:

bringing together the two flexible supporting layers with the radiation-curable layers facing toward one another;

pressing together the two flexible supporting layers with exposure to heat to form the colored multilayer composite;

partially curing the radiation-curable layers within the multilayer composite in a first step applying not more than 30% of the maximum dose of actinic radiation required for complete curing of the radiation-curable layers;

removing one of the supporting layers from the colored multilayer composite; and completely curing the radiation-curable layers in a second step using a dose of from 30% to 100% of the actinic radiation for full curing.

2. The method as claimed in claim 1, wherein applying in a first step a first radiation-curable layer (15), containing color pigments, to a first supporting layer (3), applying a second radiation-curable layer (16), containing color pigments, to a second supporting layer (7), whereby the color pigments of the first radiation curable layer differ from those of the second radiation-curable layer (15,16), wherein the first and second supporting layers (3,7) are laminated, with the first and second radiation-curable layers (15,16) facing toward one another, to form a multilayer composite (9), and partially curing said radiation-curable layers (15,16), removing one of the supporting layers, wherein laminating in a second step the multilayer composite (9) with a plastics film (12) to which a third radiation-curable layer (17) which is a clear outer layer, is applied which faces toward the multilayer composite (9), and wherein the mutually abutting first, second and third radiation-curable layers (15, 16,17) are completely cured.

3. The method as claimed in claims 1 and 2, wherein the partial curing and the complete curing of the radiation-curable layers (15, 16, 17, 23, 26, 34) is undertaken with the aid of actinic radiation.

4. The method as claimed in claim 3, wherein the actinic radiation used comprises accelerated electrons, UV radiation in the wavelength region from 50 to 480 nm or X-ray radiation in the wavelength region from 0.05 to 8.0 nm.

5. The method as claimed in claims 1 and 3, wherein the radiation-curable layers (15, 16, 17, 23, 26, 34) are based on C1–C6-alkyl acrylates and/or methacrylates, in particular are based on methyl acrylates or ethyl acrylates and/or methacrylates.

6. The method as claimed in claims 1 to 5, wherein the dose of actinic radiation for the complete curing is splitted-up to the first and second step and is adjusted so that the final amount of radiation required for the complete curing of the radiation-curable layers is applied during the second step.

7. The method as claimed in claim 6, wherein in the first step not more than 30% of the maximum dose of actinic radiation required for complete curing are applied to the radiation-curable layers (15, 16, 17, 23, 26, 34), which are partially cured by the actinic radiation.

8. The method as claimed in claim 7, wherein in the second step 30% to 100% of the actinic radiation for complete curing are applied to the partially cured, radiation-curable layers.

9. The method as claimed in claim 1, wherein the color pigments of the radiation-curable layers (15, 16, 23, 34) are selected from the group consisting of metal oxides, metal hydroxides and metal oxide hydrates, sulfur-containing silicates, metal sulfides, metal selenides, complex metal cyanides, metal sulfates, metal chromates, metal molybdates, azo pigments, indigoids, dioxazine pigments, quinacridone pigments, phthalocyanine pigments, isoindolinone pigments, perylene pigments, perinone pigments, metal complex pigments, alkali blue pigments and diketopyrrolopyrrole (DPP) pigments.

10. The method as claimed in any of claims 1 to 8, wherein applying the radiation-curable layers (15, 16, 17) to the associated supporting layers (3, 7, 12) by screen printing or stencil printing.

11. The method as claimed in any of claims 1 to 8, wherein applying the radiation-curable layers (15, 16, 17) to the associated supporting layers (3, 7, 12) by casting or by means of printing rollers.

12. The method as claimed in claim 2, wherein the first supporting layer (3) is comprising a phenolic-resin-impregnated paper web, and each of the second and third supporting layers (7, 12) is comprising a web-shaped plastics film.

13. The method as claimed in claim 12, wherein the plastics for the web-shaped plastics film is selected from the group consisting of polyolefins, such as polyethylene or polypropylene, and polyesters, or from the group consisting of polyamides.

14. The method as claimed in claim 2, wherein the second supporting layer (7) is removed from the multilayer composite (9) prior to the second step.

15. The method as claimed in claim 2, wherein a third radiation-curable layer (18) equipped with color pigments and curable with the aid of actinic radiation is applied to the multilayer composite (9) in the second step.

16. A colored multilayer composite produced by the method as claimed in claims 1 to 15, comprising a supporting layer (3) with a smooth regular surface, which is a plastics film or is a phenolic-resin impregnated paper web, onto said supporting layer are applied two or three acrylic-based, radiation-cured layers (15,16,18) laminated to each other, each of these layers contains color pigments, whereby the color pigments are different for each layer, an acrylic-based clear outer layer (17), and a peelable plastics film (12) as protective layer.

17. A colored multilayer composite produced by the method as claimed in one or more of claims 1 to 15, comprising a supporting layer (33) with a highly irregular surface, a primer layer and/or adhesion-promoter layer (34), a metallic coating (23), a clear layer (26) and a peelable supporting layer (25) made from a plastics film, and wherein the primer and/or adhesion promoter layer, the metallic coating and the clear layer have been laminated to each other and cured by radiation.

18. A colored multilayer composite as claimed in claim 16 or 17, which is bonded as a decorative coating to plates or panels made from layers of paper saturated with phenolic resins and/or with melamine resins, or made from cardboard packaging, from wood, from plastics, from resin-saturated compacted wood chips or the like, to form weather-resistant plates or panels for outdoor use.

* * * * *